United States Patent
Braun

(10) Patent No.: US 6,725,589 B2
(45) Date of Patent: Apr. 27, 2004

(54) BOTTLE WITH INTERNAL ADVERTISEMENT

(76) Inventor: Manfred Braun, Goethestrasse 8, D-65795 Hattersheim (DE)

( * ) Notice: Subject to any disclaimer, the term of this patent is extended or adjusted under 35 U.S.C. 154(b) by 0 days.

(21) Appl. No.: 09/832,293

(22) Filed: Apr. 10, 2001

(65) Prior Publication Data

US 2002/0029501 A1 Mar. 14, 2002

(30) Foreign Application Priority Data

Apr. 11, 2000 (DE) .......................... 20006423

(51) Int. Cl.$^7$ ................................. G09F 3/00
(52) U.S. Cl. ........................... 40/310; 40/406
(58) Field of Search .............. 40/615, 406, 310; 428/13

(56) References Cited

U.S. PATENT DOCUMENTS

| | | | |
|---|---|---|---|
| 4,582,498 A | | 4/1986 | Tamada |
| 4,643,693 A | | 2/1987 | Rubenstein |
| 4,871,077 A | | 10/1989 | Ogden |
| 4,909,178 A | | 3/1990 | Le Brocq |
| 5,292,564 A | * | 3/1994 | Lee .............................. 428/13 |
| 5,455,129 A | | 10/1995 | Bussard |
| 5,705,210 A | | 1/1998 | Sillince |
| 5,937,554 A | | 8/1999 | Haugk |
| 5,953,170 A | * | 9/1999 | Glancy ....................... 359/896 |
| 6,042,022 A | * | 3/2000 | Rogozinski et al. ......... 239/211 |
| 6,073,373 A | | 6/2000 | Haugk |
| 6,316,082 B1 | * | 11/2001 | Tomkins et al. ............ 428/202 |

* cited by examiner

Primary Examiner—S. Joseph Morano
Assistant Examiner—Robert J. McCarry, Jr.
(74) Attorney, Agent, or Firm—Herbert Dubno

(57) ABSTRACT

A package for a liquid includes a bottle having a transparent wall and a hologram unit received in the bottle and consisting of a carrier foil bearing the hologram and a pair of transparent protective foils sandwiching the hologram between them.

8 Claims, 4 Drawing Sheets

BOTTLE WITH INTERNAL ADVERTISEMENT

FIELD OF THE INVENTION

My present invention relates to a package for a liquid and, more particularly, to a vessel, especially a bottle containing a liquid and with advertising or decorative material in the interior of the bottle.

BACKGROUND OF THE INVENTION

In packaging of liquids, for example, perfumes, beverages, cosmetics and other substances, it is important to provide advertising material and labeling which, in addition to being informative, has a decorative, aesthetic or security property. For the most part the bottle can be provided with a label with appropriate art work. It is also known in the beverage arts, for example, to include within the bottle decorative or informative substances or articles which have a relationship to the liquid which is merchandised (U.S. Pat. No. 1,842,987). For example, beverages can contain sprigs of plants which are used for flavoring the beverages, perfumes may contain reproductions of a blossom from which the perfume is obtained, etc.

By and large, however, the incorporation of such articles in the liquid which is to be used may be counter-indicated by the fact that the article itself may become contaminated or may introduce a contaminant into the liquid. That is the case, for example, when a fruit or the like is included with the liquid contents in a bottle.

As a consequence, an image of the fruit or plant may be embossed on or molded into the bottle.

All of these approaches have only a limited ability to convey a sense of the contents and to provide a decorative effect.

OBJECTS OF THE INVENTION

It is, therefore, the principal object of the present invention to provide an improved package for liquids which is free from the drawbacks of the systems described.

Another object of this invention is to provide a package in which label contamination is minimized, the advertising and labelling information can be significantly more aesthetic than with earlier systems and which is economical, but attractive to the purchaser and user.

SUMMARY OF THE INVENTION

These objects and others which will become apparent hereinafter are attained, in accordance with the invention, by providing within the bottle a hologram on a carrier foil which is sandwiched between a pair of protective foils at least one of which is transparent and through which (and through a transparent wall of the bottle of which), the hologram can be imaged.

The package of the invention which comprises a bottle and the hologram in its protective envelope, provides a durable advertising and decorative unit which, because it is directly within the liquid, affords unique properties as the hologram is displayed or viewed. The appearance of the decorative unit changes as the angle with which it is viewed changes and with changes in the direction of incident light and the nature of the light source and as a function of the liquid of the package.

According to the invention, the decorative unit is easily introduced into the bottle by rolling it up and inserting the rolled-up unit through the neck of the bottle whereupon the rolled-up unit springs open and the hologram and indicia thereon come into view.

Preferably the decorative unit comprises a carrier foil to which the hologram is applied and a pair of protective foils which are hermetically sealed and adhere to one another by an adhesive or by welding about the periphery of the carrier foil. At least one and preferably both of the protective foils are transparent.

The invention has been found to be highly advantageous when applied to a bottle containing perfume, i.e. a perfume or cologne flask, or to a beverage or deodorant bottle. The protective foils are preferably alcohol-resistant and may be composed, for example, of any of a variety of polyesters, polyethylene or polypropylene and especially polyethyleneterephthalate (PET).

The hologram can be formed by any technique and reference may be had to my copending application Ser. No. 09/741,758 filed Dec. 19, 2000, and the references cited therein and to U.S. Pat. Nos. 5,937,554 and 6,073,373. The hologram unit, moreover, can float within the liquid in the bottle.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
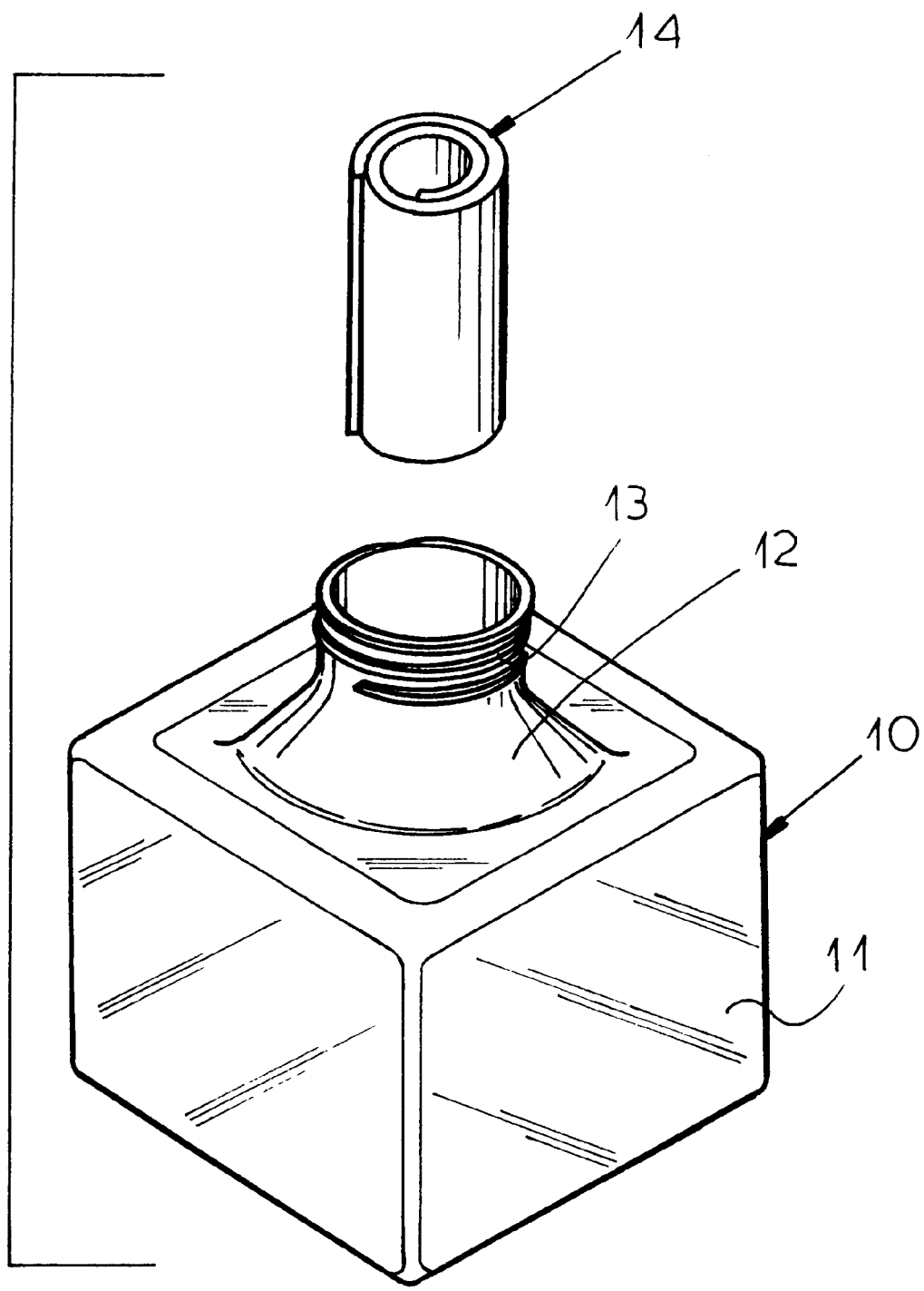
FIG. 1 is a perspective view of a perfume bottle showing the insertion of the hologram unit therein.

In FIG. 1 I have shown a perfume bottle or flask 10 which has transparent walls 11 and a neck 12 formed with a mouth 13. The hologram unit shown rolled up at 14 can be inserted through the mouth of the bottle and unrolls within the bottle as illustrated at 15 in FIG. 2 to display the hologram 16 which, for example, may be a flower whose natural odor is incorporated in the perfume within the bottle. The bottle may be filled with the liquid 17 to be packaged, namely, the perfume and the hologram can include labeling 18 as to the nature of the product and possibly the source of supply.

Figure 2:
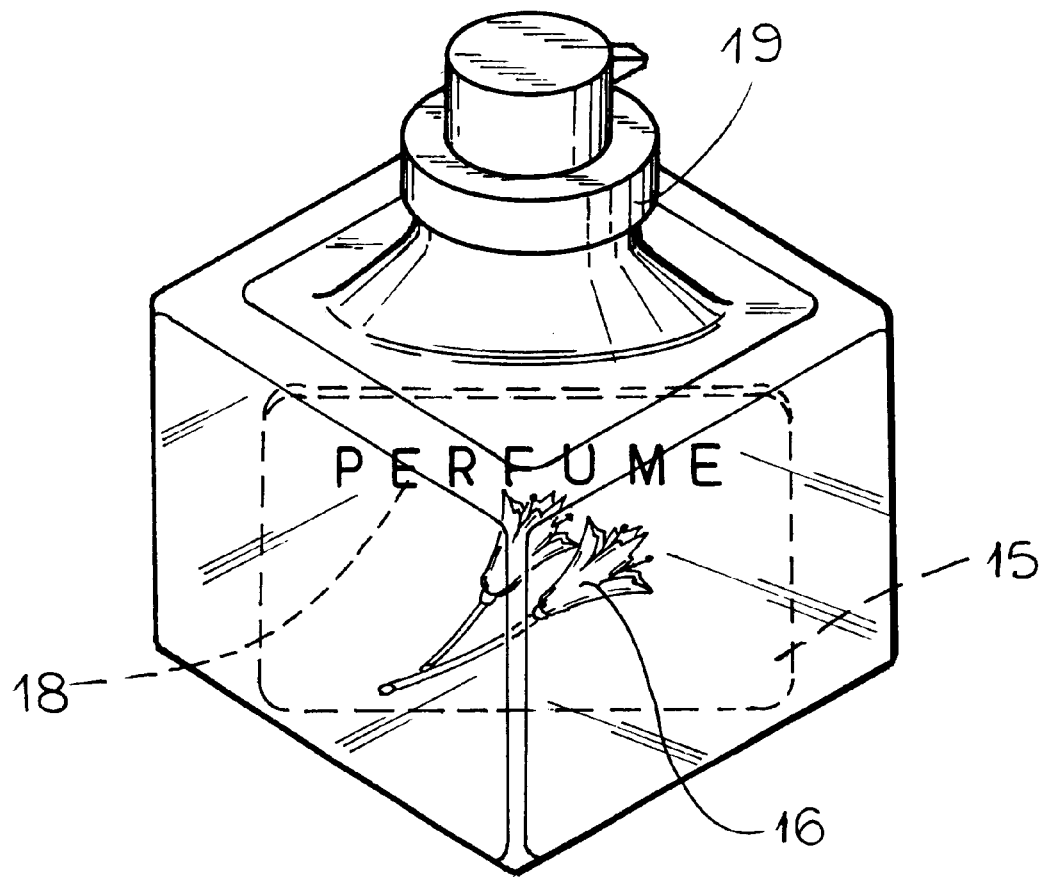
FIG. 2 is a perspective view of the unrolled hologram in the bottle.

In the embodiment of FIG. 2 a spray cap 19 is applied to the mouth of the bottle. The hologram unit is shown in greater detail at 20 in FIGS. 3 and 4 and can comprise a carrier foil 21 formed with the hologram and sandwiched between two protective foils 22 and 23 which are transparent and ultrasonically welded together at 24 around the periphery of the carrier foil 21. The latter may be provided with the hologram by conventional techniques and the hologram is displayed by the interference of light passing through the walls 11 of the container and through the foils 22 and 23.

Figure 3:
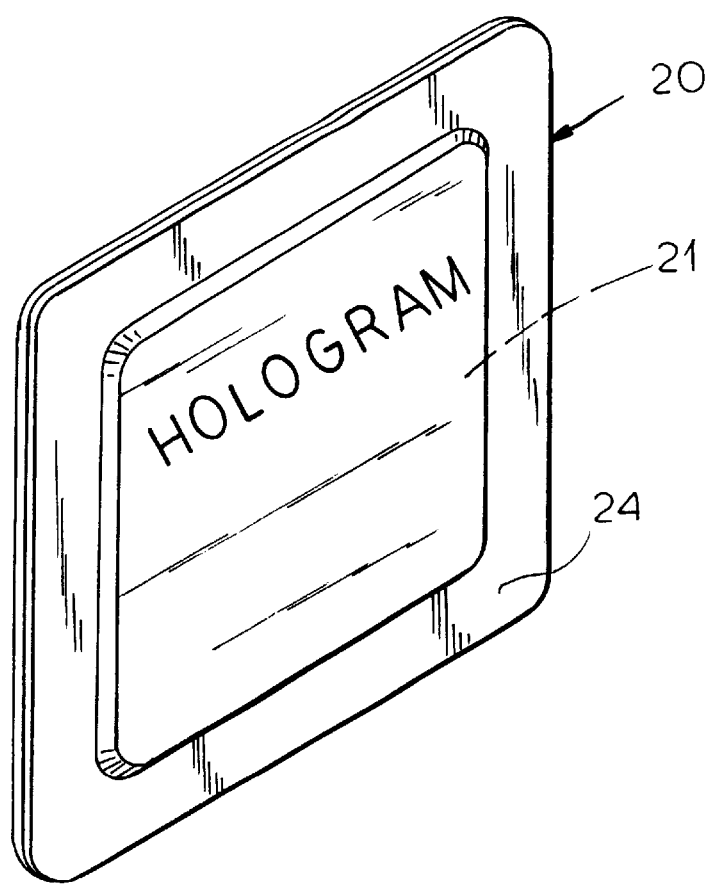
FIG. 3 is a perspective view of a hologram unit drawn to a larger scale.
Figure 4:
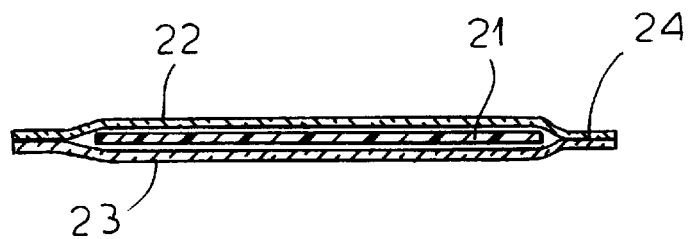
FIG. 4 is a cross sectional view through the hologram unit of FIG. 3.
Figure 5:
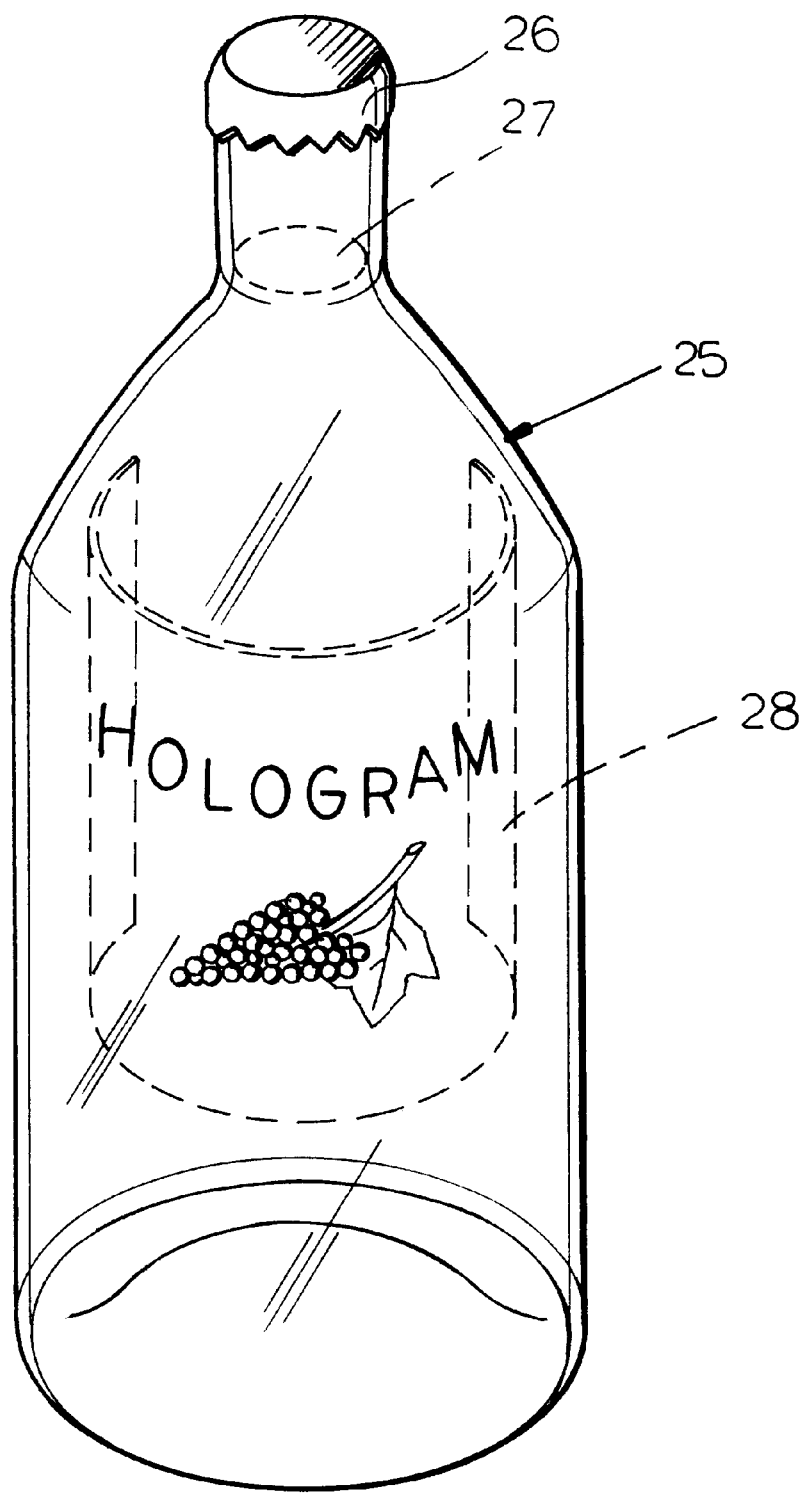
FIG. 5 is a perspective view of a beverage bottle provided with the hologram.

FIG. 5 shows a beverage bottle 25 having a cap 26 and a liquid beverage 27 contained therein. The partly unrolled hologram unit 28, which can correspond to that of FIGS. 3 and 4, is seen floating in the liquid of the bottle. Since the bottle has a transparent wall, the hologram is displayed by the lighting through the bottle wall.

The hologram within the bottle according to the invention, provides absolute security against mistake, misuse or counterfeiting. The hologram in each case can be of the transparent or nontransparent plastic foil type or a metallic foil hologram.

EXAMPLE 1

Upper and lower PET foil, each 0.020 mm thick, with a photopolymer (film) layer of 0.010 mm with a holographic image, no adhesive between them, edges welded.

Placed in a perfume bottle consisting of 85% alcohol.

No deterioration of the image after 35 weeks in room temperature of 20° C. occurred.

EXAMPLE 2

The labels cut out from three feet wide large rolls with automatic dies supplied by a commercial hologram manufacturer using a $CO_2$ laser, the PET films are welded together around the perimeter of the sandwich.

Both the cutting and the welding can, of course, be done with dies which can be heated as required or by laser.

I claim:

1. A package for a dispensable liquid comprising:
   a bottle having at least one transparent wall, and a mouth affording access to an interior of the bottle and containing a dispensable liquid;
   a hologram unit in said bottle immersed in said liquid, said unit comprising a carrier foil formed with a hologram, and a pair of protective foils sandwiching said carrier foil between them and sealing the hologram against said liquid, at least one of said protective foils being transparent to enable said hologram to be viewed therethrough and through said transparent wall; and
   a cap removably mounted on said mouth of said bottle affording access to the liquid, said cap being constructed and arranged for dispensing said liquid said liquid being a transparent liquid selected from the group which consists of perfumes, colognes, deodorants and beverages.

2. The package defined in claim 1 wherein said carrier foil is composed of a synthetic resin or a metal.

3. The package defined in claim 2 wherein said protective foils are hermetically sealed and adhered to one another.

4. The package defined in claim 3 wherein said protective foils are welded together about a periphery of said carrier foil.

5. The package defined in claim 4 wherein said bottle is a perfume flask.

6. The package defined in claim 4 wherein said bottle is a beverage bottle.

7. The package defined in claim 4 wherein said protective foils are composed of an alcohol-resistant substance.

8. A method of packaging a liquid, comprising the steps of:
   (a) providing a hologram unit having a hologram on a carrier foil sealed between a pair of protective transparent foils;
   (b) rolling up said unit;
   (c) inserting the unit rolled up in step (b) into the mouth of a bottle having a transparent wall whereby the unit unrolls inside said bottle;
   (d) filling a liquid into said bottle; and
   (e) capping the mouth of said bottle with a removable cap affording access to the liquid.

* * * * *